(12) United States Patent
Toyamasaki

(10) Patent No.: US 11,870,965 B2
(45) Date of Patent: Jan. 9, 2024

(54) IMAGE FORMING SYSTEM CAPABLE OF RECEIVING AND TRANSMITTING CAPTURED IMAGE WITH OPERATION POSITION DATA AND FURTHER REMOTELY OPERATING IMAGE FORMING APPARATUS, AND IMAGE FORMING APPARATUS

(71) Applicant: KYOCERA Document Solutions Inc., Osaka (JP)

(72) Inventor: Kenta Toyamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/865,791

(22) Filed: Jul. 15, 2022

(65) Prior Publication Data

US 2023/0028713 A1    Jan. 26, 2023

(30) Foreign Application Priority Data

Jul. 20, 2021   (JP) ................................. 2021-120051

(51) Int. Cl.
| | |
|---|---|
| *H04N 1/327* | (2006.01) |
| *G06F 3/0488* | (2022.01) |
| *H04N 1/00* | (2006.01) |

(52) U.S. Cl.
CPC ....... *H04N 1/32776* (2013.01); *G06F 3/0488* (2013.01); *H04N 1/00307* (2013.01); *H04N 1/0049* (2013.01); *H04N 1/00129* (2013.01); *H04N 1/00411* (2013.01); *H04N 1/00809* (2013.01); *H04N 1/00973* (2013.01); *H04N 2201/0075* (2013.01); *H04N 2201/0096* (2013.01)

(58) Field of Classification Search
None
See application file for complete search history.

(56) References Cited

U.S. PATENT DOCUMENTS

| | | | |
|---|---|---|---|
| 10,063,722 B2* | 8/2018 | Sugiura .............. | H04N 1/00411 |
| 2015/0261483 A1* | 9/2015 | Kato .................... | H04B 5/0031 |
| | | | 358/1.15 |
| 2015/0264220 A1* | 9/2015 | Tsukada ............. | H04N 1/00498 |
| | | | 358/1.15 |
| 2018/0275403 A1 | 9/2018 | Sawa | |
| 2019/0037094 A1* | 1/2019 | Hayashi ............. | H04N 1/00079 |

FOREIGN PATENT DOCUMENTS

JP     2018158485 A    10/2018

\* cited by examiner

*Primary Examiner* — Haris Sabah
(74) *Attorney, Agent, or Firm* — Alleman Hall Creasman & Tuttle LLP

(57) ABSTRACT

An image forming system includes a mobile terminal apparatus and an image forming apparatus. The mobile terminal apparatus displays a captured image of an operation panel of the image forming apparatus and transmits, in response to a user operation on the captured image, captured image data indicating the captured image and operation position data indicating a position of the user operation to the image forming apparatus. Based on the captured image data and the operation position data received from the mobile terminal apparatus, the image forming apparatus identifies an indirectly operated part of the operation panel, and executes an action corresponding to the identified part.

4 Claims, 6 Drawing Sheets

IMAGE FORMING SYSTEM CAPABLE OF RECEIVING AND TRANSMITTING CAPTURED IMAGE WITH OPERATION POSITION DATA AND FURTHER REMOTELY OPERATING IMAGE FORMING APPARATUS, AND IMAGE FORMING APPARATUS

INCORPORATION BY REFERENCE

This application is based upon and claims the benefit of priority from the corresponding Japanese Patent Application No. 2021-120051 filed on Jul. 20, 2021, the entire contents of which are incorporated herein by reference.

BACKGROUND

The present disclosure relates to an image forming system and an image forming apparatus.

In a system, a mobile terminal apparatus (a) captures an image of an operation panel of an image forming apparatus and displays the captured image, (b) detects a user operation on the captured image of the operation panel, (c) generates an action command corresponding to the user operation, and (d) transmits the generated command to the image forming apparatus. Upon receiving the action command, the image forming apparatus performs an action designated by the action command.

SUMMARY

An image forming system according to the present disclosure includes: an image forming apparatus including an operation panel; and a mobile terminal apparatus capable of communicating with the image forming apparatus. The mobile terminal apparatus (a) captures an image of the operation panel of the image forming apparatus to generate a captured image, (b) displays the captured image, (c) detects a user operation on the captured image, (d) identifies a position of the user operation on the captured image, and (e) transmits captured image data indicating the captured image and operation position data indicating the position of the user operation to the image forming apparatus. The image forming apparatus (a) receives the captured image data and the operation position data from the mobile terminal apparatus, (b) detects an operation panel image in the captured image indicated by the captured image data and identifies an operation position indicated by the operation position data, (c) identifies a relative position of the operation position with respect to the operation panel image, (d) identifies, based on the relative position, a part of the operation panel indirectly operated by a user, and (e) executes an action corresponding to the identified part.

An image forming apparatus according to the present disclosure includes a communication device capable of communicating with a mobile terminal apparatus of a user; an internal device; and a remote operation processing portion. The remote operation processing portion (a) receives captured image data and operation position data from the mobile terminal apparatus by means of the communication device, (b) detects an operation panel image in a captured image indicated by the captured image data and identifies an operation position indicated by the operation position data, (c) identifies a relative position of the operation position with respect to the operation panel image, (d) identifies, based on the relative position, a part of the operation panel indirectly operated by the user, and (e) executes an action corresponding to the identified part by means of the internal device. Here, the captured image data is image data indicating a captured image generated by the mobile terminal apparatus capturing an image of the operation panel of the image forming apparatus, and the operation position data is data indicating a position where a user operation on the captured image displayed on the mobile terminal apparatus was detected.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the drawings.

Figure 1:
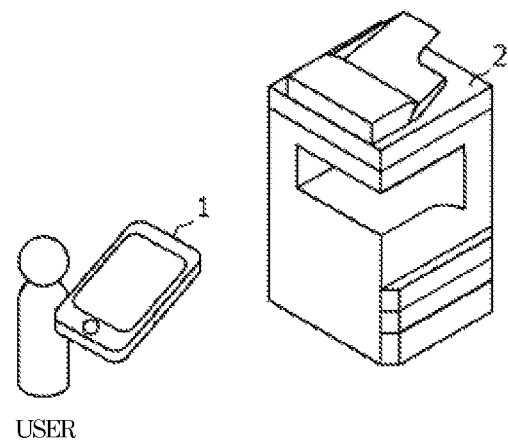
FIG. 1 shows a configuration of an image forming system according to an embodiment of the present disclosure.

FIG. 1 shows a configuration of an image forming system according to an embodiment of the present disclosure.

In the system shown in FIG. 1, a mobile terminal apparatus 1, such as a smartphone or a tablet PC, is carried by a user who uses an image forming apparatus 2. The mobile terminal apparatus 1 and the image forming apparatus 2 can communicate with each other through wireless communication or the like. It is noted that, in this system, each of a plurality of users has a mobile terminal apparatus 1, and can use the image forming apparatus 2 by means of the mobile terminal apparatus 1.

Figure 2:
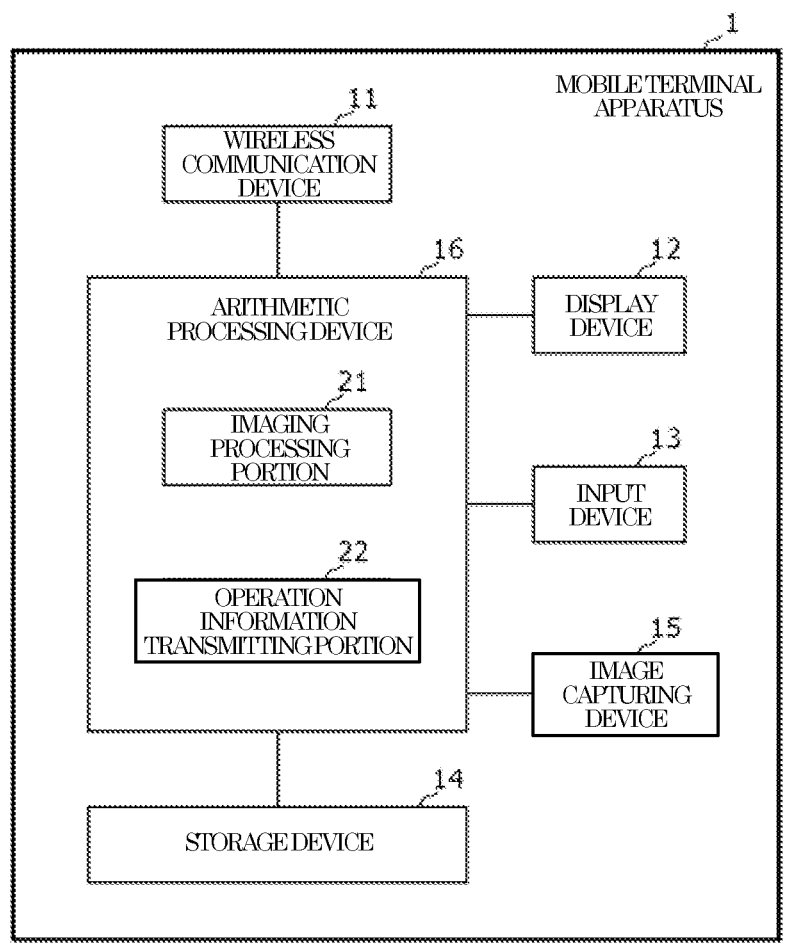
FIG. 2 is a block diagram showing a configuration of the mobile terminal apparatus 1 in FIG. 1.

FIG. 2 is a block diagram showing a configuration of the mobile terminal apparatus 1 in FIG. 1. As shown in FIG. 2, the mobile terminal apparatus 1 includes a wireless communication device 11, a display device 12, an input device 13, a storage device 14, an image capturing device 15, and an arithmetic processing device 16.

The wireless communication device 11 is a communication circuit of a predetermined wireless communication standard. The wireless communication device 11 is a wireless LAN interface, a short-range wireless communication device of Bluetooth or the like, or a mobile phone network interface (an RF interface, a baseband portion, etc.).

The display device 12 is a device such as a liquid crystal display disposed in a housing of the mobile terminal apparatus 1, and displays various screens to the user. The input device 13 is a device that detects a user operation, and includes a touch panel, hard keys, and the like disposed on the display device 12. The storage device 14 is a nonvolatile storage device such as a flash memory, and stores programs and data. The image capturing device 15 includes an image sensor and an optical system that forms an image of light from a subject on the image sensor, and generates image data of a captured image.

The arithmetic processing device 16 is a computer including a central processing unit (CPU), a read only memory (ROM), a random access memory (RAM), and the like, and loads programs from the storage device 14 or the ROM into the RAM and executes the programs to operate as various processing portions. In this embodiment, the arithmetic processing device 16 operates as an imaging processing portion 21 and an operation information transmitting portion 22.

The imaging processing portion 21 causes the image capturing device 15 to start capturing an image in accordance with a user operation on the input device 13, repeats capturing an image in real time, acquires image data of a captured image (a rectangular image obtained in the field of view of the optical system of the image capturing device 15), and displays a captured image based on the image data on the display device 12.

In one system, the mobile terminal apparatus 1 (a) captures an image of the operation panel 32 of the image forming apparatus 2 and displays the captured image, (b) detects a user operation on the captured image of the operation panel 32, (c) generates an action command corresponding to the user operation, and (d) transmits the generated command to the image forming apparatus 2. Upon receiving the action command, the image forming apparatus 2 performs an action designated by the action command.

However, in the above-described system, in order to generate an action command, the mobile terminal apparatus 1 needs to hold in advance layout information of the operation panel 32 of the image forming apparatus 2 (information such as the position of an operation screen and the positions and sizes of operation keys) as layout data.

In general, the layout of the operation panel 32 of the image forming apparatus 2 varies depending on the model of the apparatus. Therefore, the mobile terminal apparatus 1 needs to hold in advance different layout data for each model of the image forming apparatus 2. Installation of the layout data in the mobile terminal apparatus 1 is required for each model of the image forming apparatus 2, which is inconvenient for the user.

On the other hand, in the image forming system according to the embodiment of the present disclosure, the user can cause the image forming apparatus 2 to perform a desired operation by means of the mobile terminal apparatus 1 regardless of the model of the image forming apparatus 2, as will be described below.

When detecting, by the input device 13 (for example, a touch panel), a predetermined user operation (such as touch) on a captured image at a certain point in time, the operation information transmitting portion 22 identifies a position of the user operation on a captured image at that time. Then, the operation information transmitting portion 22 transmits captured image data indicating the captured image and operation position data indicating the position of the user operation to the image forming apparatus 2 by means of the wireless communication device 11.

Figure 3:
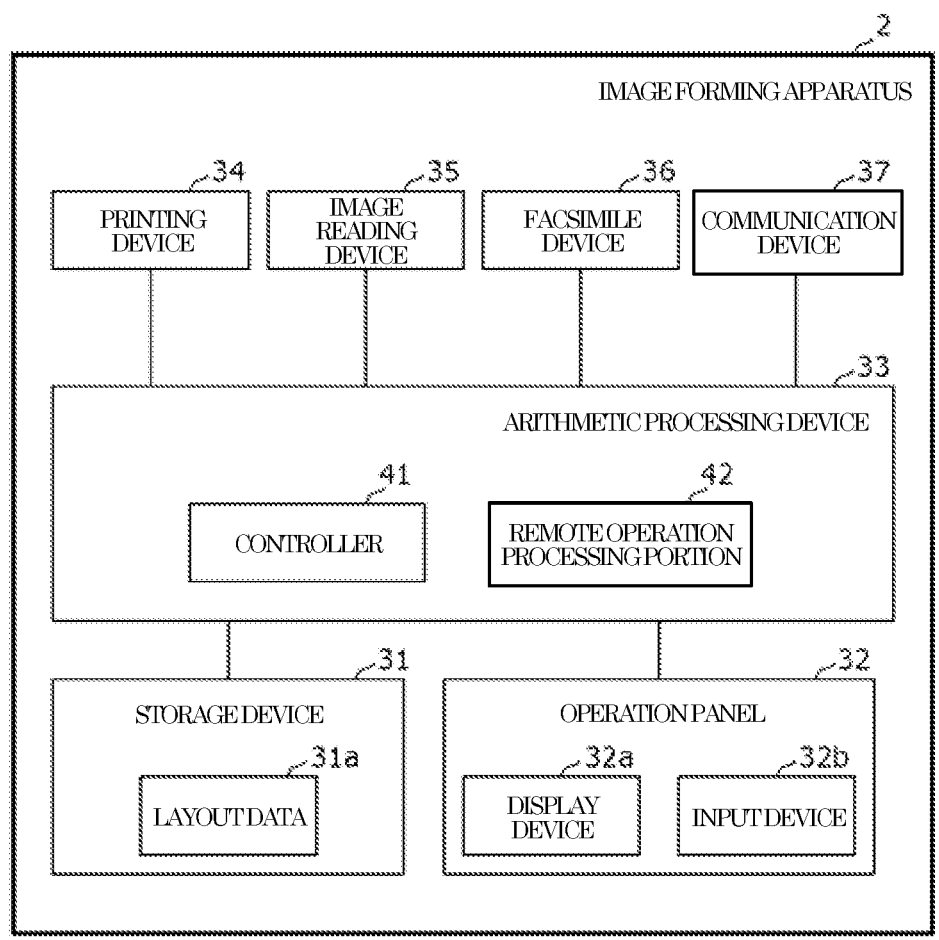
FIG. 3 is a block diagram showing a configuration of the image forming apparatus 2 in FIG. 1.

FIG. 3 is a block diagram showing a configuration of the image forming apparatus 2 in FIG. 1. As shown in FIG. 3, the image forming apparatus 2 includes a storage device 31, an operation panel 32, an arithmetic processing device 33, a printing device 34, an image reading device 35, a facsimile device 36, and a communication device 37.

The storage device 31 is a nonvolatile rewritable storage device such as a flash memory. Layout data 31a to be described later is stored in advance in the storage device 31.

The operation panel 32 is disposed on the front side of the upper surface of the housing, and includes a display device 32a such as a liquid crystal display and an input device 32b such as hard keys or a touch panel. The display device 32a displays various screens for the user. Soft keys are realized by key images displayed on the display device 32a and a touch panel. The input device 32b receives a user operation on the hard keys or the soft keys.

Figure 4:
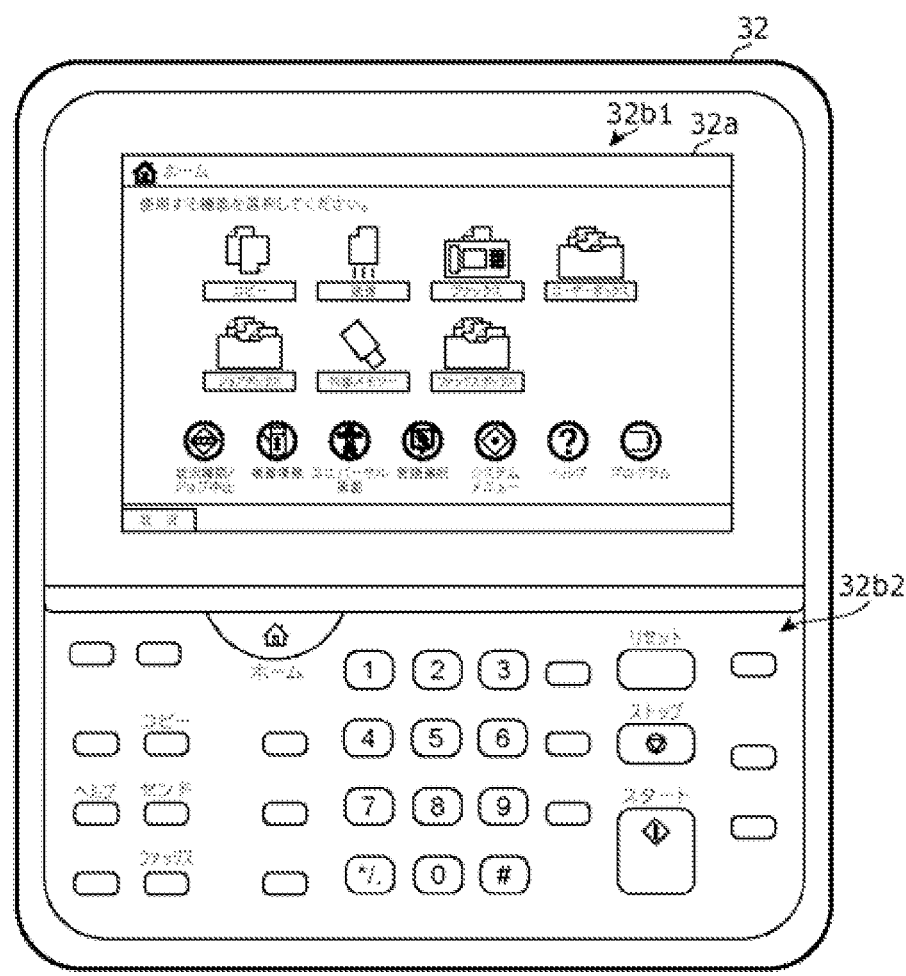
FIG. 4 shows an example of the operation panel 32 of the image forming apparatus 2 in FIG. 1 and FIG. 3.
Figure 5:
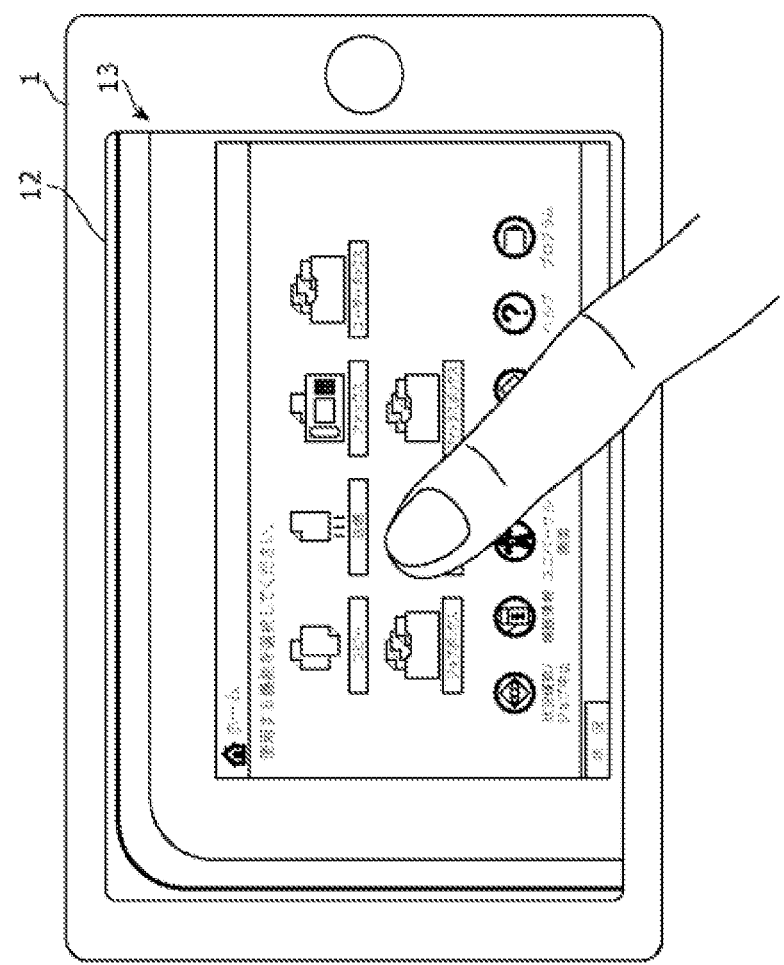
FIG. 5 shows an example of the mobile terminal apparatus 1 displaying a captured image of the operation panel 32 shown in FIG. 4.

FIG. 4 shows an example of the operation panel 32 of the image forming apparatus 2 in FIG. 1 and FIG. 3. FIG. 5 shows an example of the mobile terminal apparatus 1 displaying a captured image of the operation panel 32. As shown in FIG. 4 for example, the operation panel 32 includes, as the input device 32b, a touch panel 32b1 that causes icon images to function as soft keys, and hard keys 32b2. The mobile terminal apparatus 1 captures an image of the operation panel 32 by means of the image capturing device 15 in accordance with a predetermined user operation, and displays the captured image on the display device 12 as shown in, for example, FIG. 5. When the user presses a position in a captured image during display of the captured image, the mobile terminal apparatus 1 detects the press by the touch panel and identifies an operation image (still image) that was displayed at the time of detection of the user operation. In addition, the mobile terminal apparatus 1 identifies an operation position (pixel position) in the captured image from a position where the user operation (press) was detected, and transmits the captured image data and the operation position data to the image forming apparatus 2.

Returning to FIG. 3, the arithmetic processing device 33 is a computer having a CPU, a ROM, and a RAM, and operates as various processing portions by loading programs stored in the ROM or a storage device (not shown) into the RAM and executing the programs by the CPU. The arithmetic processing device 33 operates as a controller 41 and a remote operation processing portion 42.

The printing device 34 is an internal device that prints a document sheet image or the like on a print sheet based on image data. Specifically, the printing device 34 outputs a print product obtained by printing a document sheet image designated by a print request of the user. In addition, the image reading device 35 is an internal device that optically reads a document sheet image from a document sheet and generates image data of the document sheet image. The facsimile device 36 is an internal device that generates a facsimile signal of a document sheet image or the like based on image data and transmits the facsimile signal, and also receives a facsimile signal from outside and generates image data from the facsimile signal. The communication device 37 is an internal device, such as a wireless or wired network interface, a short-range wireless communication device, or the like, that performs data communication with the mobile terminal apparatus 1 directly or indirectly via a network.

The controller 41 controls internal devices such as the printing device 34, the image reading device 35, the facsimile device 36, and the communication device 37 to execute various kinds of processing.

The remote operation processing portion 42 (a) receives the aforementioned captured image data and operation position data from the mobile terminal apparatus 1 by means of the communication device 37, (b) detects an operation panel image in the captured image indicated by the captured image data and identifies an operation position indicated by the operation position data, (c) identifies a relative position of the operation position with respect to the identified operation panel image (a relative position coordinate value from a reference position such as one of the four corners or the center of the operation panel image), (d) identifies, based on the relative position, a part of the operation panel 32 indirectly (that is, remotely using the mobile terminal apparatus 1) operated by the user, and (e) executes an action corresponding to the identified part by means of the aforementioned internal device.

The storage device 31 stores in advance layout data 31a indicating the layout of the operation panel 32 of the image forming apparatus 2. The remote operation processing portion 42 refers to the layout data 31a to detect an operation panel image in the captured image and identify the aforementioned relative position.

The layout data 31a includes feature image data of the operation panel 32, data of the position and size of an operation part (soft key, hard key, etc.) in the operation panel image of a reference size, and the like. The feature image data of the operation panel 32 indicates a feature image. The remote operation processing portion 42 searches for a feature image in the captured image and identifies the position and magnification (magnification from the reference size) of the operation panel image in the captured image. The feature image is an image of the entire operation panel, a partial image including an edge portion of the operation panel, a partial image including a key arrangement, or the like, and may be one or more of them.

The remote operation processing portion 42 searches for a feature image designated by the layout data 31a in the captured image while changing the magnification to find an operation panel image in the captured image, and identifies the position and magnification of the operation panel image in the captured image. In addition, the remote operation processing portion 42 derives, as the relative position, the distance (the distances in the main scanning direction and the sub scanning direction) from the reference position of the operation panel image to the operation position in the captured image. Then, the remote operation processing portion 42 converts the relative position to a position in the operation panel image of the reference size based on the identified magnification, and identifies an operation part at the converted operation position (that is, the part of the operation panel 32 indirectly operated by the user).

Figure 6:
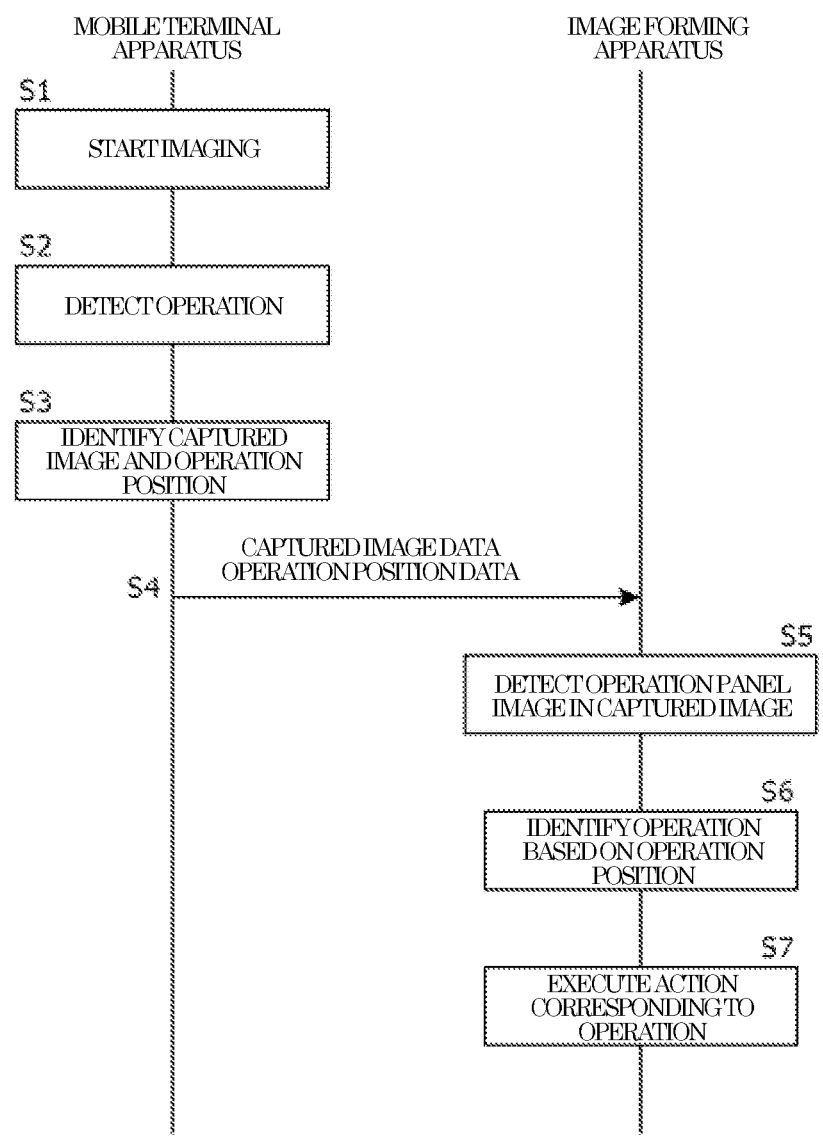
FIG. 6 is a sequence diagram illustrating an action of the image forming system shown in FIG. 1.

Next, an operation of the above-described image forming system will be described. FIG. 6 is a sequence diagram illustrating an action of the image forming system shown in FIG. 1.

In the mobile terminal apparatus 1, the imaging processing portion 21 starts imaging processing using the image capturing device 15 in accordance with a user operation on the input device 13 (step S1). Thus, as shown in FIG. 5 for example, a captured image that is captured by the image capturing device 15 is displayed on the display device 12 in real time.

The operation information transmitting portion 22 monitors whether or not a predetermined user operation (such as a touch) on the captured image was detected by the input device 13 during display of the captured image. When the operation information transmitting portion 22 detects such a user operation at a certain point in time (step S2), the operation information transmitting portion 22 identifies a captured image (still image) at that point in time and a position of the user operation on the captured image (step S3). Then, the operation information transmitting portion 22 transmits captured image data indicating the captured image and operation position data indicating the position of the user operation to the image forming apparatus 2 by means of the wireless communication device 11 (step S4).

In the image forming apparatus 2, the remote operation processing portion 42 monitors, by the communication device 37, whether or not captured image data and operation position data have been received from the mobile terminal apparatus 1. When captured image data and operation position data are received, the remote operation processing portion 42 detects an operation panel image in the captured image based on the received captured image data and the layout data 31a, and identifies the position and magnification of the operation panel image in the captured image (step S5). Then, the remote operation processing portion 42 identifies an operation position on the operation panel image of the reference size based on the position and magnification of the operation panel image in the captured image and the operation position data, and identifies an operation desired by the user (that is, an operation part) based on the operation position (step S6). It is noted that, when no operation panel image is detected in the captured image or when there is no operation part at the operation position based on operation position data, the captured image data and operation position data are ignored.

When the remote operation processing portion 42 identifies an operation desired by the user in this manner, the remote operation processing portion 42 notifies the controller 41 that the operation has been detected, and causes the controller 41 to execute an action corresponding to the operation (screen transition, execution of various kinds of processing (such as printing) using an internal device, or the like) (step S7).

As described above, according to the above embodiment, captured image data and operation position data are transmitted from the mobile terminal apparatus 1 to the image forming apparatus 2. Here, the captured image data is image data indicating a captured image generated by the mobile terminal apparatus 1 capturing an image of the operation panel 32 of the image forming apparatus 2, and the operation position data is data indicating a position where a user operation on the captured image displayed on the mobile terminal apparatus 1 was detected. The remote operation processing portion 42 of the image forming apparatus 2 (a) receives the captured image data and operation position data from the mobile terminal apparatus 1 by means of the communication device 37, (b) detects an operation panel image in the captured image indicated by the captured image data and identifies an operation position indicated by the operation position data, (c) identifies a relative position of the operation position with respect to the operation panel image, (d) identifies, based on the relative position, a part of the operation panel 32 indirectly operated by the user, and (e) executes an action corresponding to the identified part by means of an internal device.

Thus, since the mobile terminal apparatus 1 need not hold the layout data, the user can cause the image forming apparatus 2 to perform a desired operation by means of the mobile terminal apparatus 1 regardless of the model of the image forming apparatus 2. In addition, since the user can cause the image forming apparatus 2 to perform a desired operation by means of their own mobile terminal apparatus 1, the user need not touch the operation panel 32 of the image forming apparatus 2, and contact infection of infectious diseases caused by viruses or the like in recent years can be suppressed.

It is noted that various changes and modifications to the above embodiment are obvious to those skilled in the art. Such changes and modifications may be made without departing from the intent and scope of the subject matter without diminishing the intended advantages. That is, such changes and modifications are intended to be included in the scope of the claims.

For example, in the above-described embodiment, the mobile terminal apparatus 1 may identify a type of user operation (either touch or swipe) based on the track of the detected user operation or the like, and transmit operation type data indicating the type of user operation to the image forming apparatus 2 together with the operation position data. In addition, the remote operation processing portion 42 of the image forming apparatus 2 may receive the operation type data together with the operation position data from the mobile terminal apparatus 1 by means of the communication device 37, and cause the controller 41 to execute an action corresponding to the identified part and the type of user operation indicated by the operation type data by means of an internal device. In this case, when the operation type is touch, the processing is performed as described above. When the operation type is swipe, an operation start position and an operation end position are identified as the operation position, and the controller executes processing, on an operation part movable between the operation start position and the operation end position (for example, a slider in a slider bar displayed on the display device 32a), to move the display position of the operation part to the operation end position and an action corresponding to the movement of the operation part.

The present disclosure can be applied to, for example, an image forming apparatus.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming system comprising:
an image forming apparatus including an operation panel; and
a mobile terminal apparatus capable of communicating with the image forming apparatus, wherein
the mobile terminal apparatus (a) captures an image of the operation panel of the image forming apparatus to generate a captured image, (b) displays the captured image, (c) detects a user operation on the captured image, (d) identifies a position of the user operation on the captured image, and (e) transmits captured image data indicating the captured image and operation position data indicating the position of the user operation to the image forming apparatus,
the image forming apparatus executes (a) a process of receiving the captured image data and the operation position data from the mobile terminal apparatus, (b) a process of detecting an operation panel image in the captured image indicated by the captured image data and identifies an operation position indicated by the operation position data, (c) a process of identifying a relative position of the operation position with respect to the operation panel image, (d) a process of identifying, based on the relative position, a part of the operation panel indirectly operated by a user, and (e) executes an action corresponding to the identified part, and
the mobile terminal apparatus does not execute the process of identifying the part of the operation panel indirectly operated by the user.

2. An image forming apparatus comprising:
a communication device capable of communicating with a mobile terminal apparatus of a user;
an internal device; and
a remote operation processing portion, wherein
the remote operation processing portion (a) receives captured image data and operation position data from the mobile terminal apparatus by means of the communication device, (b) detects an operation panel image in a captured image indicated by the captured image data and identifies an operation position indicated by the operation position data, (c) identifies a relative position of the operation position with respect to the operation panel image, (d) identifies, based on the relative position, a part of the operation panel indirectly operated by the user, and (e) executes an action corresponding to the identified part by means of the internal device,
the captured image data is image data indicating a captured image generated by the mobile terminal apparatus capturing an image of the operation panel of the image forming apparatus, and
the operation position data is data indicating a position where a user operation on the captured image displayed on the mobile terminal apparatus was detected.

3. The image forming apparatus according to claim 2, further comprising a nonvolatile storage device, wherein
the storage device stores in advance layout data indicating a layout of the operation panel of the image forming apparatus, and
the remote operation processing portion detects the operation panel image in the captured image and identifies the relative position with reference to the layout data.

4. The image forming apparatus according to claim 2, wherein
a type of the user operation includes touch and swipe, and the remote operation processing portion receives from the mobile terminal apparatus, the operation position data and an operation type data indicating a type of the user operation by means of the communication device, and executes an action corresponding to the identified part and the type of the user operation indicated by the operation type data by means of the internal device.

* * * * *